US010640658B2

(12) United States Patent
Rueger et al.

(10) Patent No.: US 10,640,658 B2
(45) Date of Patent: May 5, 2020

(54) DIELECTRIC COATINGS AND ARTICLES

(75) Inventors: Reinhold Rueger, Roedermark (DE); Matthias Kuntz, Seeheim-Jugenheim (DE)

(73) Assignee: MERCK PATENT GMBH, Darmstadt (DE)

( * ) Notice: Subject to any disclaimer, the term of this patent is extended or adjusted under 35 U.S.C. 154(b) by 447 days.

(21) Appl. No.: 13/990,545

(22) PCT Filed: Nov. 2, 2011

(86) PCT No.: PCT/EP2011/005522
§ 371 (c)(1),
(2), (4) Date: May 30, 2013

(87) PCT Pub. No.: WO2012/072174
PCT Pub. Date: Jun. 7, 2012

(65) Prior Publication Data
US 2013/0244022 A1    Sep. 19, 2013

(30) Foreign Application Priority Data

Dec. 1, 2010  (DE) ................ 10 2010 052 889

(51) Int. Cl.
| | |
|---|---|
| C09D 5/24 | (2006.01) |
| C09D 101/18 | (2006.01) |
| H01B 3/00 | (2006.01) |
| H01B 3/18 | (2006.01) |
| C09D 7/41 | (2018.01) |
| C09D 7/61 | (2018.01) |

(52) U.S. Cl.
CPC .............. *C09D 5/24* (2013.01); *C09D 7/41* (2018.01); *C09D 7/61* (2018.01); *C09D 101/18* (2013.01); *H01B 3/004* (2013.01); *H01B 3/185* (2013.01); *Y10T 428/251* (2015.01); *Y10T 428/256* (2015.01); *Y10T 428/257* (2015.01)

(58) Field of Classification Search
CPC combination set(s) only.
See application file for complete search history.

(56) References Cited

U.S. PATENT DOCUMENTS

| | | | |
|---|---|---|---|
| 4,207,482 A | 6/1980 | Neumeyer et al. | |
| 5,320,781 A | 6/1994 | Stahlecker et al. | |
| 5,565,144 A | 10/1996 | Feist et al. | |
| 5,569,421 A | 10/1996 | Feist et al. | |
| 5,571,456 A | 11/1996 | Bergmann et al. | |
| 5,776,373 A | 7/1998 | Bergmann et al. | |
| 5,908,585 A | 6/1999 | Shibuta et al. | |
| 5,945,035 A | 8/1999 | Vogt | |
| 6,645,886 B1 | 11/2003 | Muhrer et al. | |
| 6,992,431 B2 | 1/2006 | Ito et al. | |
| 7,416,688 B2 | 8/2008 | Pfaff et al. | |
| 8,940,189 B2 | 1/2015 | Krietsch et al. | |
| 2004/0058148 A1 | 3/2004 | Ito et al. | |
| 2005/0253117 A1 | 11/2005 | Pfaff et al. | |
| 2006/0208228 A1 | 9/2006 | Chiba | |
| 2007/0297966 A1 | 12/2007 | Fujimoto | |
| 2010/0258769 A1 | 10/2010 | Krietsch et al. | |
| 2010/0270510 A1* | 10/2010 | Krietsch | C09C 1/0021 252/500 |
| 2012/0299762 A1* | 11/2012 | Frazier | F41H 13/00 342/14 |

FOREIGN PATENT DOCUMENTS

| | | |
|---|---|---|
| CN | 1454250 A | 11/2003 |
| CN | 1826665 B | 11/2010 |
| CN | 101121545 B | 3/2012 |
| DE | 4237990 A1 | 5/1994 |
| EP | 1118086 B1 | 11/2002 |
| JP | S60176447 A | 9/1985 |
| JP | S61207472 A | 9/1986 |
| JP | H0641466 A | 2/1994 |
| JP | H09115334 A | 5/1997 |
| JP | H10504515 A | 5/1998 |
| JP | 10147729 A | 6/1998 |
| JP | 2002167576 A | 6/2002 |
| JP | 2005247939 A | 9/2005 |
| JP | 2005336485 A | 12/2005 |
| JP | 2007126526 A | 5/2007 |
| JP | 2007331966 A | 12/2007 |
| JP | 200850253 A | 9/2009 |
| JP | 2011-506700 A | 3/2011 |
| WO | 2005/008685 A1 | 1/2005 |
| WO | 2009/077122 A2 | 6/2009 |
| WO | 2009/077123 A2 | 6/2009 |

OTHER PUBLICATIONS

International Search Report for PCT/EP2011/005522 (dated Apr. 18, 2012).
English Abstract of JPS61207472, Publication Date: Sep. 13, 1986.
English Abstract of JP2009203447, Publication Date: Sep. 10, 2009.
English Abstract of JP2007331966, Publication Date: Dec. 27, 2007.
English Abstract of JP2007126526, Publication Date: May 24, 2007.
English Abstract of JPS60176447, Publication Date: Sep. 10, 1985.
Office Action for related Japanese Patent Application No. 2013-541228 dated Sep. 11, 2015.
Office Action for related Chinese Patent Application No. 201180057477.8 dated Jan. 13, 2016.
Wu Liuliu, "Studies to Transparent Anti-Static Coating Containing Nano-Scale ATO", Coating Industry, vol. 34, No. 2.
Office Action in corresponding China application No. 201180057477.8 dated Aug. 16, 2017.
Translation of Office Action in corresponding Japanese Application No. 2016-248913, dated Nov. 15, 2017.
Office action in corresponding Korean 2013-7016632 Office Action dated Mar. 21, 2018.

* cited by examiner

*Primary Examiner* — Samir Shah

(57) ABSTRACT

The present invention relates to dielectric coatings and articles having high, but precisely defined specific surface resistances.

26 Claims, No Drawings

DIELECTRIC COATINGS AND ARTICLES

The present invention relates to dielectric coatings and articles having high, but precisely defined specific surface resistances.

In many applications with dielectric coatings or with articles consisting principally of dielectric materials, such as plastic parts, films or tapes, it is necessary specifically to modify the electrical properties of the materials. This is usually carried out by the use of suitable additives, such as, for example, fillers or pigments, having corresponding properties.

Thus, it is known, for example, considerably to increase the electrical conductivity of layers comprising dielectric binders by the addition of conductive pigments.

Electrically conductive pigments are employed today in various areas of application, for example for antistatic coatings, antistatic floorcoverings, antistatic treatment of explosion-protected rooms or electrically conductive primers for the painting of plastics.

In these applications, low surface and volume resistances are necessary in order to ensure an operationally safe electrical state. There is therefore a requirement for the best-possible conductivity with respect to the pigments used. Carbon black or graphite are usually employed in order to increase the conductivity of the dielectric materials. These substances meet the requirement for high conductivity, but have the disadvantage that they are black and thus always result in darkening of the materials to which they are added. This potential solution is therefore restricted to dark to black applications and is not always practicable owing to this restriction.

For the production of pale and transparent coatings, electrically conductive pigments based on transparent flake-form substrates are known. These pigments consist, for example, of mica coated with $(Sn,Sb)O_2$ or with a layer sequence comprising $TiO_2/SiO_2/(Sn,Sb)O_2$ (for example Minatec® 31 CM or 30 CM from Merck KGaA). In an example, the substrate consists of a mixture of mica and spherical $SiO_2$ particles. Pigments of this type, which are produced and marketed by Merck KGaA, are described, for example, in the patents DE 38 42 330 and DE 42 37 990 (Merck), EP 0 139 557 (Catalysts & Chemicals Ind.) or EP 0 359 569 and EP 0 743 654 (DuPont) and U.S. Pat. No. 7,416,688 (Merck). Such pigments are transparent, have a pale mass tone and have high conductivity. Pale or transparent conductive coatings having specific surface resistances in the kiloohm range are accessible with these pigments. The values apply for direct voltage and low-frequency alternating voltage. The specific surface resistance σ is the term applied to the resistance based on a square and measured on a surface. Another customary term is square resistance.

These pigments are distinguished over the conductive pigment carbon black which is principally customary today by the fact that they have a pale colour and higher transparency. Thus, colour and electrical conductivity can be combined in a very good manner, whereas there is always a restriction to dark colours on use of carbon black. In contrast to carbon black or graphite, the pigments additionally offer the possibility of adjusting the conductivity via the composition and choice of the preparation parameters.

The pigments enable the production of conductive, antistatic and antistatically dissipative coatings which have specific surface resistances in the range from about 100 ohm to 100 megaohm. In most applications, a low resistance is desired, preferably between 1 kohm and 1 megaohm. If, however, resistances in the higher ohm range are required, these are established by adapting the formulation, mostly by reducing the amount of conductive pigment used or addition of an electrically non-conductive filler. In the case of carbon blacks or graphites, but also other conductive inorganic materials, such as, for example, SiC, this is the only way of controlling the resistances of the layer or the volume of the conductive dielectric preparation. In the region of higher resistances above 100 megaohm (lower conductivities, partially conductive layers), the formulation of a suitable preparation is therefore difficult, since the system comprising dielectric binder and the conductive pigment is located in the steep region of the percolation curve and extremely small changes in the use concentration, the humidity, solvent contents, light or the homogeneity of the system result in severe changes in the conductivity. The setting and maintenance of a defined resistance of the coating or of a volume is thus extremely difficult.

In addition, the electrical interactions in the heterogeneous and microscopically inhomogeneous systems comprising dielectric binder, optionally additives and conductive pigment are extremely complex and cannot be represented by the simplified circuit diagram of ohmic resistances connected in series and parallel. Instead, the dielectric constant and dielectric strength of the binder system in the microscopic range and the impedance also play an essential role, very particularly in and below the boundary region of the percolation threshold for the conductive pigment. An effect of these complex electrical interactions is that the frequency dependence of the conductivity increases greatly in this concentration range of the conductive pigments and the resistance can vary very greatly. Due to the thermal expansion of the binder matrix, a strong temperature dependence of the electrical parameters also arises. Other swelling or shrinking processes, for example due to continuing cross-linking, due to evaporation or sweating of plasticisers or solvents or uptake of solvent or water vapour, can also result in considerable changes in the electrical properties.

However, irreversible processes can also occur if, for example, the properties change microstructures due to a single application of an electric field or due to temperature influences.

Low resistance values are achieved in the pigment-containing materials if the pigment volume concentration in the dielectric matrix is above the percolation threshold. The percolation threshold is the minimum concentration of conductive pigment in a dielectric at which continuous conduction paths can be formed. In this concentration range, the electrical resistance of the material changes by several powers of ten in the case of small changes in the pigment volume concentration. This threshold is typically 10-20% by vol. of pigment in the preparation. If the pigment volume concentration is below this threshold, the electrical resistance is essentially determined by the dielectric matrix material. Specific surface resistances of such materials in the form of paints or mouldings are typically in the teraohm range in a dry atmosphere.

Coatings or functional materials having specific surface resistances in the range from $10^8$ to $10^{13}$ ohm are of major interest, for example, in high-voltage technology or in sensor elements.

Semiconducting functional materials having nonlinear properties are specifically employed in electrical engineering for control of the function of electrical components. An example of a nonlinear property is a voltage-dependent resistance. Applications of this type are described, for example, in Andreas Küchler "Hochspannungstechnik"

[High-Voltage Technology], Springer Verlag, 3rd Edition, 2009 or in ETG Specialist Reports 110 and 112, 3rd ETG Congress, Wirzburg, 2008. Materials having voltage-dependent resistance are used, for example, as varistors.

Semiconducting coatings and tapes having voltage-dependent resistance are employed for electrical field control in high-voltage insulation, for example for resistive field control in cable fittings. The prior art comprises composites of silicon carbide and dielectric binders in the form of paints or tapes.

There is a constant demand here for improved material properties. DE 19839285 proposes employing conductive pigments coated with antimony-doped tin oxide in tapes for end corona shielding in generators. In the case of the invention, pigments having high conductivity are employed, the dispensed amounts are in the region of the percolation threshold. The pigments comprise 12 to 15 mol % of antimony in antimony-doped tin oxide. The resistance of the tapes is adjusted via the concentration of the pigments in the resin matrix.

However, specific resistances in the range from $10^8$ to $10^{13}$ ohm can only be set with difficulty using conductive pigments of high conductivity since, for the high resistances of the functional materials, the preparations have to be formulated with pigment concentrations in the region of the percolation threshold. In this concentration range, sudden changes in the electrical properties occur. Small concentration variations, degree of crosslinking, residual solvent or water contents or also external parameters, such as, for example, temperature, can allow the resistance of the functional material to vary by several powers of ten. A stable state can only be established and maintained with considerable effort. The method of controlling high resistance values in the dielectric material accurately via low concentrations of conductive pigment is unsuitable in practice. There is therefore an urgent demand for pigments with which semiconducting functional materials having readily adjustable and stable electrical properties are accessible.

For specific applications of partially conductive coatings, for example for potential control in electrical equipment, however, layers of defined high resistance (partially conductive layers) are necessary, variations in the resistances or even irreversible changes due to the effect of electric fields cannot be tolerated.

The object of the present invention is to find compositions comprising dielectric binders, optionally further dielectric additives and semiconducting pigments which have defined electrical properties. The coatings should preferably be pale or transparent. Furthermore, the coatings should have the lowest possible frequency dependence of the resistances.

Surprisingly, it has now been found that pale dielectric coatings and articles comprising semiconducting pigments, dielectric binder and optionally further dielectric additives, having high defined specific surface resistances greater than or equal to $10^8$ ohm can be produced if the pigment volume concentration of the semiconducting pigment in the dielectric coating or in the article is 10% or higher.

In a preferred embodiment,
the specific powder resistance of the pigments is greater than 100 kohm·cm and less than 1 gigaohm·cm, and/or
the semiconducting pigment consists of tin oxide, doped tin dioxide, supports coated with tin oxide or doped tin dioxide, doped titanium dioxide, titanium suboxide, or supports coated with titanium dioxide or titanium suboxide.

Semiconducting pigments in this patent application are taken to mean pigments having the following properties: in contrast to conductive pigments, which have specific powder resistances of less than 100 kohm*cm, preferably less than 1 kohm*cm, the specific powder resistance of the semiconducting pigments is in the range from 100 kohm*cm to 100 mega-ohm*cm. The resistance range of a coating comprising semiconducting pigments is in the lower resistance range of insulating materials having specific resistances in the mega- to teraohm range.

The electrical properties of the semiconducting pigment powders are characterised by the specific powder resistance. In order to measure the specific resistance of a pigment powder, an acrylic glass tube having an internal diameter of 2 cm is filled with a fill depth of 0.5 to 1 cm of the pigment, which is compressed between two opposing metal rams with the aid of a weight of 10 kg. The electrical resistance R of the pigment pressed disc obtained in this way is measured by application of an ohmmeter to the two metal rams. The specific powder resistance p of the pigment is calculated from the layer thickness L and the diameter d of the pigment pressed disc and the measured resistance R, in accordance with the formula $$\rho = [R \cdot \pi \cdot (d/2)^2]/L \ [\text{ohm·cm}].$$

The pigment volume concentration is given by the volume of the semiconducting pigments divided by the total volume of the coating or article, consisting of binder, semiconducting pigment and optionally fillers and further additives, the quotient multiplied by 100 and expressed in %.

In a preferred embodiment, the semiconducting pigments consist of mica flakes which are coated with tin dioxide, where the tin dioxide may also be doped. The tin dioxide layer is preferably doped, but need not be doped. Activation of the semiconducting tin dioxide may be sufficient to achieve a conductivity for a specific powder resistance of greater than 100 kohm·cm. An activation step of this type can be, for example, calcination under nitrogen, argon, $CO_2$ or another inert gas, calcination under weakly reducing conditions or exposure to UV light. In this step, the tin dioxide is converted into an excited state, which is frozen by cooling and is responsible for the low conductivity. However, the tin dioxide is preferably doped. Antimony and fluorine are particularly suitable for the doping. Doping with antimony is particularly preferred. The conductivity and thus the specific powder resistance is also dependent on the thickness of the tin dioxide layer on the support. The layer thickness of the tin dioxide layer is preferably 15 to 50 nm.

Suitable semiconducting pigments having low conductivity, expressed by the specific powder resistances of ≥100 kohm·cm to 100 megaohm·cm, can, however, also be prepared by post-coating of conductive pigments with a thin or not entirely continuous layer having higher resistance. A layer of this type can consist, for example, of $SiO_2$ and/or $Al_2O_3$, ZnO or of $TiO_2$. These coatings are then thinner than the partially conductive tin dioxide layer on a support and can have an average thickness of 1 to 15 nm, preferably 5-10 nm.

However, organic coatings as are customary, for example, for the weather stabilisation and hydrophobicisation of inorganic pigments are also suitable. Typical examples are coatings with organic silanes.

The methods for the control of the conductivities via post-coatings of more conductive pigments can also be applied to support-free tin dioxides and to mixtures of support-free conductive pigments with those on supports.

A further method for the control of the conductivities and the setting of specific powder resistances of ≥100 kohm*cm is co-doping with ions which reduce the conductivity, for example through the formation of electron traps in the crystal lattice or by reducing the electron mobility in the crystal. Examples of such ions by means of which the conductivity of antimony-doped tin dioxide is reduced are sodium or titanium.

Further possibilities for the setting of a defined low conductivity consist in the choice of the drying and calcination parameters, for example temperature, time and composition and pressure of the atmosphere.

Besides tin dioxide, other semiconducting metal oxides and such metal oxide layers on supports are also suitable for the production of the dielectric coatings according to the invention. Examples of such metal oxides are optionally doped titanium dioxide, optionally doped zinc oxide or zinc stannate.

Suitable semiconducting pigments are expressly also mixtures of pigments having different specific powder resistances. Thus, for example, a semiconducting or conductive pigment having a specific powder resistance of less than 100 kohm*cm can be mixed with one or more semiconducting pigment having a specific powder resistance of greater than 100 kohm*cm in such a way that the mixture has a specific powder resistance of ≥100 kohm*cm. Whether the pigments are pre-mixed as powders or added separately to the coating preparation in the corresponding ratios is unimportant. Mixing of semiconducting pigments of different specific powder resistances enables a broad range of dielectric coatings having different surface resistances to be established in an elegant manner using few pigments.

In a particularly preferred embodiment, the conductive layer employed, optionally on a flake-form substrate, is
  antimony-doped tin dioxide,
  fluorine-doped tin dioxide,
  chlorine-doped tin dioxide,
  tungsten-doped tin dioxide,
  molybdenum-doped tin dioxide,
  antimony- and titanium-doped tin dioxide,
  antimony- and iron-doped tin dioxide, or
  antimony- and phosphorus-doped tin dioxide.

Particular preference is given to a conductive layer consisting of antimony-doped tin oxide. The tin to dopant, in particular antimony, molar ratio in this preferred embodiment is 99.99:0.01-97:3, in particular 99.8:0.2-99:1.

The semiconducting pigment is preferably composed of 40-80% by weight of substrate and 20-60% by weight of semiconducting layer, where the sum of substrate and semiconducting layer is 100% by weight.

Particular preference is given to semiconducting pigments comprising 40-80% of mica and 20-60% by weight of the doped tin dioxide layer. The amount of tin dioxide here is dependent on the specific surface area of the substrate used.

Very particularly preferred pigments consist of mica flakes having a particle size <15 μm, coated with generally 35-60% by weight of doped tin dioxide, based on the entire pigment. If, by contrast, the mica flakes have a particle size of <60 μm, preferably 10-60 μm, the pigments preferably comprise 20-40% by weight of tin dioxide, based on the entire pigment.

The particle size quoted refers to the $d_{90}$ in the case of volume-weighted measurement by means of laser diffraction, for example determined using a Malvern Mastersizer 2000. The average particle size $d_{50}$ of the particularly preferred pigments is between 2 and 8 μm. Pigments of this type frequently exhibit advantages in the applications with respect to the settling behaviour, the dispersibility and/or the homogeneity of the coatings.

The layer thickness of the conductive layer is preferably 20-70 nm, in particular 30-40 nm.

The post-coating of semiconducting pigments with a thin layer of a dielectric or further semiconducting material is frequently advantageous for the establishment of relatively high resistances.

Particular preference is given to the application of a thin layer of $TiO_2$, ZnO, $Al_2O_3$, $Cr_2O_3$ or $SiO_2$ to the semiconducting layer. The layer thicknesses are generally <0.1 μm, preferably <0.05 μm. The amount of dielectric or semiconducting material, based on the conductive layer, is preferably 0.5-5% by weight.

Particularly preferred semiconducting pigments have the following layer structure on a substrate flake:
  substrate+$SnO_2$ (doped)
  substrate+$SnO_2$ (doped)+$TiO_2$
  substrate+$SnO_2$ (doped)+$SiO_2$
  substrate+$SnO_2$ (doped)+ZnO
  substrate+$SnO_2$ (doped)+$Al_2O_3$
  substrate+$SnO_2$ (doped)+$Cr_2O_3$
  substrate+$SiO_2$+$SnO_2$ (doped)
  substrate+$TiO_2$+$SnO_2$ (doped).

Very particularly preferred semiconducting pigments have the following structure:
  mica flake+$SnO_2$ (doped)
  mica flake+$SnO_2$ (doped)+$TiO_2$
  mica flake+$SnO_2$ (doped)+$SiO_2$
  mica flake+$SnO_2$ (doped)+ZnO
  mica flake+$SnO_2$ (doped)+$Al_2O_3$
  $Al_2O_3$ flake+$SnO_2$ (doped)
  $Al_2O_3$ flake+$SnO_2$ (doped)+$TiO_2$
  $Al_2O_3$ flake+$SnO_2$ (doped)+$SiO_2$
  $Al_2O_3$ flake+$SnO_2$ (doped)+ZnO
  $Al_2O_3$ flake+$SnO_2$ (doped)+$Al_2O_3$.

In a preferred embodiment, the doping preferably involves antimony oxide.

In a particularly preferred embodiment, use is made of low-resistance semiconducting pigments, which are preferably based on mica flakes, in particular mica flakes having particle sizes <15 μm. Very particular preference is given to mica flakes having particle sizes <15 μm which, based on the substrate, are covered with 70% by weight of a conductive layer, preferably tin dioxide, where the conductive layer is doped with 1% by weight of antimony, based on the conductive layer. In this way, low-resistance varistor pigments are obtained which have a specific surface resistance in a coating of $10^8$ ohm and a nonlinearity coefficient alpha of 4.5 at a field strength of 200 V/mm.

High-resistance pigments preferably consist of mica flakes having particle sizes <15 μm. Very particular preference is given to mica flakes having particle sizes <15 μm which, based on the substrate, are covered with 70% by weight firstly with a conductive layer, preferably tin dioxide, where the conductive layer is doped with 0.25% by weight of antimony, based on the conductive layer, and subsequently have a $TiO_2$ layer, where the $TiO_2$ content is 1.4% by weight, based on the substrate. The specific surface resistance of a pigment-containing coating is $10^{12}$ ohm and the nonlinearity coefficient alpha is 4.

In the present application, low-resistance relates to the resistance of a dielectric insulating material and is defined as follows:

The specific surface resistance of a coating consisting of a binder and the semiconducting pigment at a (pigment volume concentration (PVC) of 11-20% is $10^7$ to $10^9$ ohm*cm.

In the present application, high-resistance is defined as follows:

The specific surface resistance of a coating consisting of a binder and pigment at a PVC of 12-20% is $10^{11}$ to $10^{13}$ ohm*cm.

The layer thicknesses of the coatings are greater than 10 µm, preferably greater than 20 µm.

It is not the composition of the pigment that is crucial for the production of the coatings or articles according to the invention, but instead the specific powder resistance of the pigment employed or of the pigment mixture. Coatings are, for example, thin or thick paint layers, printed layers or powder-coating layers. Articles are, for example, films, tapes, plates, wound films and tapes, mouldings, such as, for example, insulator heads, but also painted parts.

The present invention also relates to the use of the coatings according to the invention in sensors, for example in a flat contact sensor, in security applications, such as, for example, hidden machine-readable strips in identity cards, which are recognised via electrical properties, for floorcoverings, films, of ceramic materials, of glasses, of paper, in laser marking, in thermal protection, in photosemiconductors and as functional materials for high-voltage technology. The coating according to the invention is particularly suitable for the specific setting of the electrical properties of end corona shielding systems, in particular those in rotating electrical machines.

In particular, materials whose electrical conductivity increases with the electrical field strength are used for end corona shielding. A characteristic quantity for the nonlinear electrical conductivity of the material is the current density/field strength characteristic line. The current density/field strength characteristic line generally has an S-shaped form, where it is attempted to place the operating point of the end corona shielding in the region of the inflexion point of the S-shaped curve. The characteristic line is essentially linear in the region of the inflexion point and characterised by its slope if the current density/field strength characteristic line is plotted double-logarithmically.

End corona shielding is conventionally formed by a tape or paint applied to the main insulation, where the tape or paint is formed by a polymer matrix in which semiconducting pigments are embedded, where the increase in the current density/field strength characteristic line plotted double-logarithmically, called the nonlinearity exponent alpha, is about 3.3. Depending on the particle size and the particle density of the pigments in the polymer matrix, conductive transitions arise at the points of contact of the particles, enabling current paths to form in the end corona shielding. The type and number of these current paths crucially determines the position of the current density/field strength characteristic line or the specific electrical resistance of the end corona shielding.

A desired material characteristic line prespecified in this way can be achieved by semiconducting pigments. In this case, the pigments determine the slope of the current density/field strength characteristic line plotted double-logarithmically in the design point.

For the production of the coatings and articles according to the invention, it is, as mentioned above, not the composition of the semiconducting pigment that is crucial, but instead the specific powder resistance of the pigment or pigment mixture.

The following examples are intended to explain the invention in greater detail, but without limiting it.

EXAMPLES

Examples 1-4

100 g of ground and classified natural mica having a particle size of <15 µm are suspended in 1900 ml of deionised water. A 50% by weight aqueous $SnCl_4$ solution, HCl and a 35% by weight aqueous $SbCl_3$ solution are added dropwise to the suspension under acidic conditions at 75° C. with stirring. The pH is kept constant by simultaneous regulated metered addition of sodium hydroxide solution. When all the solution has been added, the mixture is stirred at 75° C. for a further 30 min, subsequently cooled to room temperature with stirring, and the reaction mixture is neutralised. The pigment obtained is filtered off via a suction filter, washed with water, dried at 140° C. and calcined at 800° C. for 30 min., giving 178 g of pale-grey to ochre-yellow pigment powder, depending on the antimony content (about 99% of theory). In experiments 1-4, the powder resistances of the pigments are varied via variation of the antimony content in the tin oxide, as depicted in Table 1.

In order to measure the specific resistance of a pigment powder, an amount of 0.5 to 3 g of the pigment is introduced into an acrylic glass tube having an internal diameter of 2 cm and compressed between two opposing metal rams with the aid of a weight of 10 kg. The electrical resistance R of the pigment pressed disc obtained in this way is measured by application of an ohmmeter to the two metal rams. The specific resistance ρ of the pigment is calculated from the layer thickness L and the diameter d of the pigment pressed disc and the measured resistance R, in accordance with the formula $$\rho=[R\cdot\pi\cdot(d/2)^2]/L \text{ [ohm·cm]}.$$

TABLE 1

| Examples | Mol % of Sb | ρ [ohm · cm] |
| --- | --- | --- |
| Example 1 | 15 | 28 |
| Example 2 | 8 | 68 |
| Example 3 | 1.0 | $2.5 \times 10^6$ |
| Example 4 | 0.2 | $30 \times 10^6$ |

Preparation of the Nitrocellulose Lacquer:

0.5 kg of collodium wool are dissolved in a mixture of 2.1 kg of n-butyl acetate, and 1.5 kg of ethyl acetate. A solution of 0.65 kg of Acronal 700 L in 0.65 kg of ethyl acetate and 0.6 kg of toluene is subsequently stirred in. The viscosity of the lacquer is subsequently measured and if necessary adjusted to a value between 1.9 and 2.1 Pa·s by addition of a mixture of 1.4 parts of n-butyl acetate and 1 part of ethyl acetate.

Example 5

Production of Partially Conductive Paint Films

Paint films having different pigment volume concentrations are produced with the pigments from Examples 1-4 (B1-B4). To this end, the pigments are dispersed in the above-mentioned nitrocellulose lacquer. Glass plates are coated with the resultant paints using a film-drawing machine with chambered doctor blade. The layer thickness of the dry films is 50 µm. Paint films having a different pigment volume concentration are produced by dispersing in different amounts of the pigments.

The coated glass plates are dried in air in the dark and conditioned at 40% atmospheric humidity. 3 pairs of electrodes with a length of 10 cm and a separation of 1 cm are applied to the coating using Silver Conductive Lacquer 5900 from Busch and copper foil. The resistances Ro between the electrodes are measured using a Metriso 5000D-PI teraohmmeter with an operating voltage of 1000 V after 8 hours, 24 hours and 48 hours. Resistances of less than $10^7$ ohm are measured with an operating voltage of 100V.

The specific surface resistance σ is calculated in accordance with the formula

σ=Ro*electrode length/electrode separation [Ω]

The target value for the specific surface resistance σ is in the range between 1 and 1000 gigaohm; the deviations of the resistance from deviations in the composition of the layer should be as small as possible.

The results are listed in Table 2.

TABLE 2

| | Experiment | | | | | | | |
|---|---|---|---|---|---|---|---|---|
| | 5.1 | 5.2 | 5.3 | 5.4 | 5.5 | 5.6 | 5.7 | 5.8 |
| | | | | Pigment | | | | |
| | B1 | B1 | B1 | B1 | B2 | B2 | B2 | B2 |
| PVC[%] | 9.8 | 11 | 13 | 18 | 9.8 | 11 | 13 | 18 |
| σ (8 h) | >$10^{12}$ | >$10^{12}$ | $8*10^9$ | $2*10^4$ | >$10^{12}$ | >$10^{12}$ | $5*10^{10}$ | $6*10^4$ |
| σ (24 h) | >$10^{12}$ | $2*10^{10}$ | $5*10^7$ | $1*10^4$ | >$10^{12}$ | $8*10^{10}$ | $2*10^8$ | $4*10^4$ |
| σ (48 h) | $1*10^{11}$ | $6*10^9$ | $1*10^7$ | $8*10^3$ | >$10^{12}$ | $7*10^{10}$ | $6*10^7$ | $3*10^4$ |

| | Experiment | | | | | | | |
|---|---|---|---|---|---|---|---|---|
| | 5.9 | 5.10 | 5.11 | 5.12 | 5.13 | 5.14 | 5.15 | 5.16 |
| | | | | Pigment | | | | |
| | B3 | B3 | B3 | B3 | B4 | B4 | B4 | B4 |
| PVC[%] | 9.8 | 11 | 13 | 18 | 9.8 | 11 | 13 | 18 |
| σ (8 h) | >$10^{12}$ | >$10^{12}$ | $4*10^{10}$ | $2*10^9$ | >$10^{12}$ | >$10^{12}$ | $1*10^{11}$ | $4*10^{10}$ |
| σ (24 h) | >$10^{12}$ | >$10^{12}$ | $2*10^{10}$ | $1*10^9$ | >$10^{12}$ | $9*10^{10}$ | $5*10^{10}$ | $3*10^{10}$ |
| σ (48 h) | >$10^{12}$ | $8*10^{10}$ | $1*10^{10}$ | $8*10^8$ | >$10^{12}$ | $8*10^{10}$ | $3*10^{10}$ | $2*10^{10}$ |

The experiments with a pigment volume concentration of less than 10% are all above the desired resistance range, irrespective of what specific powder resistance the pigment has. The system is located below the percolation threshold.

At higher pigment volume concentrations, a decrease in the resistances with time is observed. This is a consequence of evaporation of residual solvents from the partially conductive paint films and results in slight changes in the pigment volume concentrations, which rise due to evaporation of the solvent residues. These result in changes in the resistances in the desired resistance range from 1 to 1000 gigaohm ($10^9$ to $10^{12}$ ohm). Pigments B1 and B2 having specific powder resistances of <<100 kohm exhibit considerable changes of about 2 powers of ten in the desired surface resistance range, while pigments B3 and B4 have changes in the order of only one power of ten. This shows that the compositions according to the invention are significantly less susceptible to variations in the composition of the layers.

If the change in the specific resistances σ is considered as a function of the pigment volume concentrations after complete evaporation of the solvent residues after 48 h, it then becomes clear that the resistances in the case of the paint films comprising comparative pigments B1 and B2 decrease by 6 powers of ten, while the resistances only drop by 1-2 powers of ten in the case of the paint films according to the invention comprising pigments B3 and B4. The comparison makes it clear that the resistances are very much less dependent on the pigment volume concentrations in the case of the preparations according to the invention and can thus be set and kept constant much better.

The invention claimed is:

1. A dielectric coating or dielectric article comprising:
one or more semiconducting pigments, a dielectric binder and optionally further dielectric additives,
wherein said dielectric coating or dielectric article has a pale color,
wherein said one or more semiconducting pigments are particles containing a substrate, a semiconducting layer and optionally a further layer of $TiO_2$, $SiO_2$, ZnO, $Cr_2O_3$, or $Al_2O_3$, and selected from the following:
mica flake substrate+$SnO_2$ doped semiconducting layer,
mica flake substrate+$SnO_2$ doped semiconducting layer+$TiO_2$ layer,
mica flake substrate+$SnO_2$ doped semiconducting layer+$SiO_2$ layer,
mica flake substrate+$SnO_2$ doped semiconducting layer+ZnO layer,
mica flake substrate+$SnO_2$ doped semiconducting layer+$Cr_2O_3$ layer,
mica flake substrate+$SnO_2$ doped semiconducting layer+$Al_2O_3$ layer,
$Al_2O_3$ flake substrate+$SnO_2$ doped semiconducting layer,
$Al_2O_3$ flake substrate+$SnO_2$ doped semiconducting layer+$TiO_2$ layer,
$Al_2O_3$ flake substrate+$SnO_2$ doped semiconducting layer+$SiO_2$ layer,
$Al_2O_3$ flake substrate+$SnO_2$ doped semiconducting layer+ZnO layer,
$Al_2O_3$ flake substrate+$SnO_2$ doped semiconducting layer+$Cr_2O_3$ layer, and
$Al_2O_3$ flake substrate+$SnO_2$ doped semiconducting layer+$Al_2O_3$ layer,
wherein said $SnO_2$ doped semiconducting layer has a tin to dopant molar ratio of 99.8:0.2-99:1, and wherein
(a) the pigment volume concentration of the semiconducting pigment in said dielectric coating or dielectric article is 12-20% and the specific surface resistance of the coating or article is $10^{11}$ to $10^{13}$ ohm*cm; or
(b) wherein the pigment volume concentration of the semiconducting pigment in said dielectric coating or article is 11-20% and the specific surface resistance of the coating is $10^7$ to $10^9$ ohm*cm.

2. The dielectric coating or dielectric article according to claim 1, wherein the specific powder resistance of the semiconducting pigment is ≥100 kohm·cm and less than 1 gigaohm·cm.

3. The dielectric coating or dielectric article according to claim 1, wherein the specific powder resistance of the semiconducting pigment is greater than 100 kohm·cm and less than 1 gigaohm·cm.

4. In a sensor, security application, floorcovering, film, ceramic material, glass, paper laser marking, thermal protection, photosemiconductor, or functional material for high-voltage technology comprising a dielectric coating the improvement wherein the dielectric coating is according to claim 1.

5. The sensor according to claim 4, wherein said sensor is a flat contact sensor.

6. The dielectric coating or dielectric article according to claim 1, wherein the substrate of said semiconducting pigment is mica flakes.

7. The dielectric coating or dielectric article according to claim 1, wherein said semiconducting layer is antimony-doped tin dioxide, fluorine-doped tin dioxide, chlorine-doped tin dioxide, tungsten-doped tin dioxide, molybdenum-doped tin dioxide, antimony- and titanium-doped tin dioxide, antimony- and iron-doped tin dioxide, or antimony- and phosphorus-doped tin dioxide.

8. The dielectric coating or dielectric article according to claim 7, wherein the semiconducting layer is antimony-doped tin oxide.

9. The dielectric coating or dielectric article according to claim 7, wherein the thickness of said semiconducting layer is 20-70 nm.

10. The dielectric coating or dielectric article according to claim 1, wherein the pigment contains 40-80% by weight of said substrate and 20-60% by weight of said semiconducting layer, based on the sum of said substrate and semiconducting layer.

11. The dielectric coating or dielectric article according to claim 1, wherein said substrate is mica flakes and the pigment contains 40-80% by weight of said substrate and 20-60% by weight of said semiconducting layer, based on the sum of said substrate and semiconducting layer.

12. The dielectric coating or dielectric article according to claim 1, wherein the substrate of said semiconducting pigment is mica flakes, having a particle size $d_{90}$<15 μm, and the amount of said semiconducting layer is 35-60% by weight based on the total weight of the pigment.

13. The dielectric coating or dielectric article according to claim 1, wherein the substrate of said semiconducting pigment is mica flakes, having a particle size $d_{90}$<60 μm, and the amount of said semiconducting layer is 20-40% by weight based on the total weight of the pigment.

14. The dielectric coating or dielectric article according to claim 1, wherein the specific powder resistance of the semiconducting pigment is ≥100 kohm·cm to 100 megaohm·cm.

15. The dielectric coating or dielectric article according to claim 1, wherein said dielectric coating or dielectric article has a specific surface resistance σ in the range between 1 and 1000 gigaohm.

16. The dielectric coating or dielectric article according to claim 1, wherein the average thickness of said further layer is 1 to 15 nm.

17. The dielectric coating or dielectric article according to claim 1, wherein the average thickness of said further layer is 5-10 nm.

18. The dielectric coating or dielectric article according to claim 1, wherein the thickness of said further layer is <0.1 μm.

19. The dielectric coating or dielectric article according to claim 1, wherein the amount of said further layer 0.5-5% by weight, based on the amount of the semiconducting layer.

20. The dielectric coating or dielectric article according to claim 1, wherein the substrate of said semiconducting pigment is mica flakes, having a particle size $d_{90}$ 10 to 60 μm, and the amount of said semiconducting layer is 20-40% by weight based on the total weight of the pigment.

21. The dielectric coating according to claim 1, wherein the layer thicknesses of said coating is greater than 10 μm.

22. The dielectric coating or dielectric article according to claim 1, wherein the thickness of said semiconducting layer is 10-50 nm.

23. The dielectric coating or dielectric article according to claim 1, wherein said one or more semiconducting pigments are selected from the following:
mica flake substrate+$SnO_2$ doped semiconducting layer,
mica flake substrate+$SnO_2$ doped semiconducting layer+$TiO_2$ layer,
mica flake substrate+$SnO_2$ doped semiconducting layer+$SiO_2$ layer,
mica flake substrate+$SnO_2$ doped semiconducting layer+ZnO layer,
mica flake substrate+$SnO_2$ doped semiconducting layer+$Cr_2O_3$ layer, and
mica flake substrate+$SnO_2$ doped semiconducting layer+$Al_2O_3$ layer.

24. The dielectric coating or dielectric article according to claim 1, wherein said one or more semiconducting pigments are selected from the following:
$Al_2O_3$ flake substrate+$SnO_2$ doped semiconducting layer,
$Al_2O_3$ flake substrate+$SnO_2$ doped semiconducting layer+$TiO_2$ layer,
$Al_2O_3$ flake substrate+$SnO_2$ doped semiconducting layer+$SiO_2$ layer,
$Al_2O_3$ flake substrate+$SnO_2$ doped semiconducting layer+ZnO layer,
$Al_2O_3$ flake substrate+$SnO_2$ doped semiconducting layer+$Cr_2O_3$ layer, and
$Al_2O_3$ flake substrate+$SnO_2$ doped semiconducting layer+$Al_2O_3$ layer.

25. The dielectric coating or dielectric article according to claim 1, wherein the average particle size $d_{50}$ of the pigment is between 2 and 8 μm.

26. The dielectric coating according to claim 1, wherein the pigment volume concentration of the semiconducting pigment in said dielectric coating is 11-18%.

* * * * *